3,057,920
PROCESS FOR PREPARING 3,4',5-TRIBROMOSALI-
CYLANILIDE IN ACETIC ACID
Charles H. Schramm, Hillsdale, N.J., assignor to Lever Brothers Company, New York, N.Y., a corporation of Maine
No Drawing. Filed Dec. 5, 1957, Ser. No. 700,731
2 Claims. (Cl. 260—559)

The present invention relates to process for the preparation of a novel chemical compound, 3,4',5-tribromosalicylanilide, to the compound itself, and to germicidal soap compositions containing the same.

Polyhalosalicylanilides can be made in good yield by the direct condensation of a halogenated salicylic acid and a halogenated aniline. However, although this method is satisfactory in the laboratory, it is not acceptable commercially, because of the difficulty of carrying it out, whether with or without a catalyst, and because of the poor yields.

In accordance with the invention, 3,4',5-tribromosalicylanilide is obtained in a high yield by the bromination of salicylanilide with three moles of bromine. In this bromination, it is theoretically possible to obtain a wide variety of polybrominated products, the bromine being substituted in any of several combinations of one, two and three positions in the two rings. However, in accordance with the invention the bromine entering the rings is oriented to give substantially entirely the 3,4',5-tribromo isomer by effecting the bromination in a medium composed of from 25 to 75% acetic acid and from 75 to 25% water.

The water when present in a concentration within the range stated by some unknown mechanism shifts the reaction in favor of the 3,4',5-tribromo derivative. Glacial acetic acid is not an effective reaction medium; in glacial acetic acid, the reaction product is approximately 50% the 4',5-dibromo derivative, and the total yield is reduced to 74%. Bromination in water alone yields a product having a dark color, the reaction proceeds more slowly, and the total yield is appreciably lower, due to the formation of the tarry products imparting the dark color.

Salicylanilide is insoluble in the reaction medium at the reaction temperatures. Stirring therefore is essential throughout the reaction in order to keep the system uniform. Enough of the reaction medium should be used to ensure complete suspension of the salicylanilide, but apart from this the amount is in no way critical. The larger the volume of reaction medium, the more difficult the mix is to handle and the more dilute will be the suspension, so that the reaction will proceed more slowly. A reaction medium having a concentration of less than about 5% salicylanilide thus would not be used. At a concentration in excess of about 12%, the reaction mixture becomes quite thick and difficult to stir. Usually a concentration of from 8% to 10% is preferred.

The reaction proceeds smoothly at a temperature within the range from 40° to 60° C. Preferebaly, from 50° to 55° C. is employed, since at the more elevated temperatures the color of the product may be dark. At temperatures below 40° C. the reaction proceeds too slowly to be practical.

It is not desirable to add all of the bromine required for the reaction to produce the tribromo product at the start of the reaction, since too high an initial bromine concentration may lead to the production of brominated products containing more than three bromine atoms per molecule. In such cases, the bromine can be added dropwise or in small increments over a period of from one-half to three hours. After all of the bromine has been added, the reaction mixture is held at the reaction temperature for a sufficient time to allow reaction to proceed to completion, usually in about one-half to two hours' time. The reaction mixture then can be allowed to cool to room temperature, and is filtered to remove the desired product which also is insoluble in the reaction medium.

The following examples are illustrative:

Example 1

Salicylanilide (213 g., one mole) was suspended in two liters of a 50% water-50% acetic acid solution and brought to 55° C. The suspension was stirred and 480 g. (three moles) of bromine was added dropwise while maintaining a temperature from 55° to 60° C. The bromine addition required ninety minutes, and the mixture was held at 55° C. for an additional hour. At the end of this time the product was cooled to room temperature and filtered. The filter cake was washed twice with methanol and dried. The yield was 441 g. (98%) of material containing 95% 3,4',5-tribromosalicylanilide and 2% 5-monobromosalicylanilide.

Example 2

Example 1 was repeated, employing a reaction medium composed of 75% acetic acid and 25% water, under the same reaction conditions. The yield was 98.5% of 3,4',5-tribromosalicylanilide and 1.5% monobromosalicylanilide.

Example 3

Example 1 was repeated, employing a reaction medium composed of 25% acetic acid and 75% water, under the same reaction conditions. The yield was 94% 3,4',5-tribromosalicylanilide and 3% 5-monobromosalicylanilide.

It is apparent from the above data that as the amount of water increases from 25 to 75% the yield decreases, and so also does the proportion of tribromo derivative. The water in the presence of acetic acid plays an important part in orienting the bromine and in permitting introduction of a greater proportion of bromine into the reaction product. In glacial acetic acid, it is difficult to introduce more than two moles of bromine into the salicylanilide even when an excess of bromine is used.

3,4',5-tribromosalicylanilide is a novel compound having the structure:

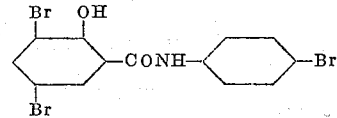

3,4',5-tribromosalicylanilide is a white compound, solid at room temperature, insoluble in water, soluble in hot acetone and very soluble in dimethylformamide. This compound has extraordinary bactericidal properties, and these properties are retained in the presence of soap.

Soap and nonsoap compositions containing 3,4',5-tribromosalicylanilide have shown excellent germicidal effectiveness when subjected to standardized tests carried out as follows:

(1).—*The serial basin handwashing test* (a modification of the Price test described by Arthur R. Cade, Soap and Sanitary Chemicals, June 1950, pages 37 and 38). This test determines the skin bacterial flora at various time intervals as brought about by the continuous use of germicidal soap over a one week period or more. At least six individual subjects are used as a panel in each test. Two types of soap are used in the test, the germicidal soap employed daily for the one week test period and the plain soap used where the wash water is collected in various basins for determining the counts of bacteria removed.

The subject exposes the arms up to the elbow, and washes hands and half of the forearms under the tapsoaping for fifteen seconds, lathering for one minute and rinsing for fifteen seconds. This cycle is repeated for a total of three washes. A fourth wash, up to the wristline, is then made in a basin containing 2000 cc. of sterile tap water. The bacterial count of the water is determined by removing two 1 cc. samples which are added to 15 to 18 cc. of melted nutrient agar. This is agitated, allowed to cool and hardened and incubate at 37° C. for forty-eight hours. At the end of this time, the number of colonies present are counted and the counts multiplied by 2000.

The above test is repeated at the end of the test period. The percent reduction in bacterial count is computed on the basis of the reduction in count of the basin wash water.

(2).—*The finger imprint test.* This test measures the inhibitory effect of an 8% solution (basis soap weight) of different germicidal soap bars containing the bactericide.

For use in the test, cultures of *Micrococcus pyogenes* var. *aureus* are maintained on nutrient broth with transfers made daily. In preparing the agar plates, 0.1 ml. of a twenty-four hour nutrient broth culture of the test organism is mixed thoroughly into 15 ml. of melted nutrient agar, which is then poured into a Petri plate and permitted to harden. The fingers of the subject's hands are immersed in small beakers containing 8% solutions of the germicidal bar in question. The fingers are thoroughly rinsed with water, dried and then placed lightly for a short time, a few seconds, on the agar plate. The plates are incubated overnight, and the contacted areas examined for absence of bacterial growth. A sharply outlined clear zone is given a rating of 4, a clear area with a hazy periphery is rated 3, a hazy but perceptible imprint 2, a barely perceptible imprint 1, and no detectable imprint 0. Thus, the lower the numerical rating the less effective the bactericide.

The following examples are illustrative:

Example 4

Soap-synthetic chips (30 lbs.) containing 24.9% sodium tallow soap, 35% sodium coconut oil soap, 18% acyl methyl taurate prepared from 40–1.V. tallow fatty acids, 5% miscellaneous unidentified matter from the soap and taurate, 10% stearic acid, 0.02% butylated hydroxy toluene, and the balance water, were weighed into a chip mixer. To these chips were added 0.5% 3,4',5-tribromosalicylanilide, 0.8% perfume, 0.0022% pigment (FD&C Red #4), and 0.2% $TiO_2$. The batch was mixed for ten minutes, milled three times over a three-roll mill, and plodded into bars. All percentages shown above are expressed on the weight of the whole mixer composition.

8% aqueous solutions were prepared from one of these soap bars and subjected to the finger imprint test. Other bars were used in the serial basin wash test. In the finger imprint test, 3,4',5-tribromosalicylanilide gave a rating of 3.5. In contrast, 4',5-dibromosalicylanilide in a germicidal soap bar prepared in exactly the same way and of the same composition gave a rating of 0.7. In the serial basin wash test, the 3,4',5-tribromosalicylanilide gave an average percent reduction of 74%, as compared with 41% for a bar of the same soap containing 4',5-dibromosalicylanilide and included for comparison purposes.

Example 5

700 lbs. of soap chips and 14% water prepared from a fat charge of 80% tallow soap and 20% coconut oil soap were placed in a chip mixer followed by 0.5% 3,4',5-tribrimosalicylanilide, 0.7% perfume, 0.0087% dye, and 0.3% preservative. The batch was thoroughly mixed, plodded at 100 to 115° F. into bars, cut and stamped. In the serial basin wash test using twelve subjects, there was an average of 64% reduction in the bacterial count.

Example 6

A bar was prepared having the following composition:

| | percent |
|---|---|
| Sodium salt of isethionic acid esterified with mixed hydrogenated coconut oil fatty acids and the fatty acids obtained from hydrogenated white grease [1] | 70 |
| Sodium phenyl polypropylene sulfonate (95% active) | 5 |
| Polyethylene glycol (molecular weight 4000) (Carbowax 4000) | 5 |
| Stearic acid | 20 |

[1] 20% hydrogenated white grease fatty acids (10 iodine value) and 80% hydrogenated coconut oil fatty acids (5 iodine value) condensed as the acid chloride with sodium hydroxyethane sulfonate.

The named ingredients were mixed at 100° C. in a Werner-Pfleiderer type mixing apparatus having a capacity of ten gallons, and the hot, pasty mass then run through a conventional three roll mill equipped with cooling water and milled into solid ribbons and chips. The chips were weighed into a chip mixer and to these were added 2% 3,4',5-tribromosalicylanilide, 0.8% perfume, and 0.2% pigments. The batch was mixed for ten minutes, and milled three times over a three roll mill, then plodded into bars in a conventional vacuum soap plodder at 160° F. The bar had a bright, white color, and a pH of 7. 8% aqueous solutions were prepared from one of these soap bars and subjected to the finger imprint test. The rating was 3+.

Only small amounts of 3,4',5-tribromosalicylanilide are required to render soap germicidal. An amount as low at 0.01% based on the weight of the soap produces a soap composition having excellent antibacterial potency. As much as 5% has been used to advantage. There is no need to employ more than is required to give the desired germicidal effect, and in general for this reason from 0.2 to 2% would be preferred. Increasing the concentration of the compound beyond 5% merely increases the cost of the soap, and at such concentrations there may be a reduction in the detergent properties of the composition, as well as a possibility of skin irritation. It will readily be seen that the concentration is not critical, but would be determined from a consideration of these factors as long as enough is used to give the desired antibacterial effect.

The germicidal activity of 3,4',5-tribromosalicylanilide in soaps and nonsoaps increases as the pH is increased, i.e., made more alkaline. Lowest germicidal activity is displayed at pH 7 and the best germicidal activity at pH 10 and above. However, the lower germicidal activity at pH 7 can be compensated for by using more of the germicide.

In the quantities in which the compound is used in soaps, it does not produce skin irritation, is not toxic, and is compatible with the usual soap components.

The term "soap" as used herein refers to alkali metal soaps of the saturated and unsaturated higher fatty acids having from about eight to about twenty-six carbon atoms, such as capric, caprylic, lauric, myristic, palmitic, stearic, oleic, linoleic, linolenic, arachidic, behenic, margaric, tridechoic, and cerotic acids and the mixtures of such acids naturally occurring in fats, oils, waxes, and rosins, such as the soaps of coconut oil fatty acids, tallow fatty acids, pig fat, fish oil fatty acids, beeswax, palm oil fatty acids, sesame oil fatty acids, peanut oil fatty acids, olive oil fatty acids, palm kernel oil fatty acids, cottonseed oil fatty acids, soyabean oil fatty acids, corn oil fatty acids, babassu oil fatty acids, rosin acids, abietic acid, and greases.

While several mixing procedures will be apparent to those skilled in the art in order to achieve this result, the following procedure is recommended: The soap chips are weighed into the mixer and followed immediately by addition of the remaining components of the mix, for example, perfume and dye, in the form of a solution if desired, and mixing is continued for a long enough period to ensure a thorough dispersion. Thereafter the 3,4',5-tribromosalicylanilide is added with complete and adequate mixing only for the time to ensure uniformity of dispersion. The final mix then can be treated in the conventional ways to produce the desired soap. To form a bar, for example, the mix can be plodded and extruded using conventional equipment.

The 3,4',5-tribromosalicylanilide soaps in accordance with the invention can be formed as bar soaps, powdered soaps, chip soaps, flake soaps, bead soaps, bar and cake soaps and soap compositions intended for toilet, washing and disinfectant purposes in addition to their use as detergents. The compositions can be dried in any desired way; spray drying is convenient in many instances. It is desirable to hold the temperature to which the mix is subjected during conversion into its final form below the temperature at which the 3,4',5-tribromosalicylanilide would be decomposed. Soap mixtures in accordance with the invention have been subjected to temperatures up to 215° F. for periods of up to one hour without disadvantage.

The compositions of the invention meet all of the requirements for germicidal soaps, as is evident from tests which have been carried out on them, and are indistinguishable in appearance from ordinary soaps. They can be used as ordinary detergent soaps and are especially recommended for uses in which both detergent and degerming characteristics are desired. The test results show that the compositions used routinely for a period of from one to two weeks lower the bacterial flora of the skin to a very low level. The compositions are particularly valuable for routine surgical and hospital use and generally useful in the prevention of infections arising from skin bacteria.

Those skilled in the art will perceive many variations in the compositions of the invention. For example, the 3,4',5-tribromosalicylanilide need not be the only germicidal agent; other germicides, such as 2,2'-dihydroxy halogenated diphenyl methanes, can be included, if desired.

The soap compositions, in addition to the soap and germicide, will also usually contain fillers, coloring materials and perfumes, as desired as is familiar to those skilled in the art.

The compositions containing the 3,4',5-tribromosalicylanilide may contain mixtures of detergents, such as soap and anionic nonsoap, or soap and a nonionic nonsoap. Typical satisfactory anionic nonsoaps are the alkyl sulfates, typified by sodium lauryl sulfate, known in the trade as Duponol C, the alkyl aryl sulfonates, typified by the sodium polypropylene benzene or toluene sulfonates, and the sodium keryl benzene or toluene sulfonates, the sulfated ethoxynated phenols, typified by the ammonium salt of sulfated ethoxynated nonyl phenol, prepared by condensation of nonyl phenol with five moles of ethylene oxide, and the sodium fatty acid amides of taurine, typified by sodium palmitic or oleic methyl tauride or mixtures thereof, and the esters of higher fatty acids and hydroxy ethane sulfonates such as oleic acid, coconut oil fatty acid and tallow fatty acid esters of hydroxy ethane sodium sulfonate. Also useful are nonionic nonsoaps, such as the polyethylene glycol esters of the higher fatty acids, typified by polyoxyethylene ethylene and propylene glycol stearates, the polyethylene glycol ethers of alkyl phenols, typified by the condensation product of oxtyl and nonyl phenol with five to twelve moles of ethylene oxide, and the higher fatty acid esters of sorbitan-ethylene oxide condensates, such as sorbitan monostearate ester of polyoxyethylene glycol. They may be in any of the forms described heretofore, including cakes or powders, and may include various fillers, sudsing agents and ingredients conventionally employed in detergent formulations. They may be compounded for various purposes, such as for shampoo, dishwashing, textile laundering, toilet soaps and similar preparations.

The 3,4',5-tribromosalicylanilide may be included in compositions which contain soap or other surface active agents not intended primarily for detergent use, such as various powdered cosmetics.

All percentages in the specification and claims are by weight of the soap.

I claim:
1. A process for preparing 3,4',5-tribromosalicylanilide which comprises brominating one mole of salicylanilide with 3 moles of bromine in a reaction medium consisting essentially of from 25 to 75% water and from 75 to 25% acetic acid.
2. A process in accordance with claim 1 the bromine being added dropwise.

References Cited in the file of this patent
UNITED STATES PATENTS

| | | |
|---|---|---|
| 2,047,513 | Laska et al. | July 14, 1936 |
| 2,047,514 | Laska et al. | July 14, 1936 |
| 2,703,332 | Bindler et al. | Mar. 1, 1955 |
| 2,730,502 | Beaver et al. | Jan. 10, 1956 |
| 2,731,386 | Reiner | Jan. 17, 1956 |
| 2,795,555 | Shumard | June 11, 1957 |
| 2,802,029 | Schuler | Aug. 6, 1957 |

FOREIGN PATENTS

| | | |
|---|---|---|
| 516,037 | Belgium | Dec. 31, 1952 |

OTHER REFERENCES

Bradfield et al.: Journal of the Chemical Society, Part I, pages 1006–1012 (1928).
Bradfield et al.: Journal of the Chemical Society, Part II, pages 2810–2817 (1929).
Hirwe et al.: Journal Indian Chemical Society, vol. 16, pages 281–284 (1939).
Robertson et al.: Journal of the Chemical Society, pages 276–79 (1943).
Hackh's Chemical Dictionary, 3rd ed. (1944), page 6.
Jadhav et al.: J. Univ. Bombay, vol. 20, sec. A3 (1951), pages 97–100.